US012718573B2

(12) United States Patent
Li et al.

(10) Patent No.: US 12,718,573 B2

(45) **Date of Patent: *Aug. 25, 2026**

(54) VIDEO ANALYTICS TO DETECT INSTANCES OF POSSIBLE ANIMAL ABUSE BASED ON MATHEMATICAL MODELS

(71) Applicant: ElectrifAi, LLC, Jersey City, NJ (US)

(72) Inventors: Huiping Li, Clarksville, MD (US); Michael Fox, Sparks, NV (US)

(73) Assignee: Daitrix, LLC

( * ) Notice: Subject to any disclaimer, the term of this patent is extended or adjusted under 35 U.S.C. 154(b) by 0 days.

This patent is subject to a terminal disclaimer.

(21) Appl. No.: 18/641,963

(22) Filed: Apr. 22, 2024

(65) Prior Publication Data

US 2025/0095374 A1 Mar. 20, 2025

Related U.S. Application Data

(63) Continuation of application No. 17/186,497, filed on Feb. 26, 2021, now Pat. No. 11,967,154.

(Continued)

(51) Int. Cl.

*G06V 20/52* (2022.01)
*G06F 18/21* (2023.01)

(Continued)

(52) U.S. Cl.

CPC .............. *G06V 20/52* (2022.01); *G06F 18/21* (2023.01); *G06N 20/00* (2019.01); *G06V 20/41* (2022.01);

(Continued)

(58) Field of Classification Search

None

See application file for complete search history.

(56) References Cited

U.S. PATENT DOCUMENTS 10,268,753 B2 * 4/2019 Bar-Or ................ G06F 16/2455
10,275,502 B2 * 4/2019 Hubmann ................ G06F 8/60

(Continued)

FOREIGN PATENT DOCUMENTS

WO 2015/025249 A2 2/2015

OTHER PUBLICATIONS

Chan et al. "Human motion classification using 2D stick-model matching regression coefficients", pp. 70-89, ISSN 0096-3003, hereby referred to as "Chan", https://doi.org/10.1016/j.amc.2016.02.032.2016. (Year: 2016).*

(Continued)

*Primary Examiner* — Tahmina N Ansari

(74) *Attorney, Agent, or Firm* — Nutter McClennen & Fish LLP

(57) ABSTRACT

Video analytics are used to evaluate interactions between humans and animals and identify possible occurrences of animal abuse in an objective manner. The video analytics system processes successive video frames to identify objects of interest (e.g., humans, animals, tools/weapons, etc.), creates mathematical models of such objects (e.g., essentially stick-figure models), analyzes movements of such objects (e.g., the speed and/or directional motion of an object or portion of an object such as an arm or leg), determines mathematically and objectively whether or not the analyzed movements meet predetermined criteria for possible abuse (e.g., wherein the predetermined criteria can be mathematical models defining ethical and unethical movements), and outputs relevant information via a user interface (e.g., a list of possible abuse instances identifying the time and probability of possible abuse, from which the user can select an instance in order to view the corresponding video for human analysis).

22 Claims, 32 Drawing Sheets
(32 of 32 Drawing Sheet(s) Filed in Color)

Related U.S. Application Data

(60) Provisional application No. 62/982,966, filed on Feb. 28, 2020.

(51) Int. Cl.
*G06N 20/00* (2019.01)
*G06V 20/40* (2022.01)
*G06V 40/10* (2022.01)
*G06V 40/20* (2022.01)

(52) U.S. Cl.
CPC .............. *G06V 20/46* (2022.01); *G06V 40/10* (2022.01); *G06V 40/23* (2022.01)

(56) References Cited

U.S. PATENT DOCUMENTS

| | | | | |
|---|---|---|---|---|
| 11,175,910 | B2 * | 11/2021 | Gowda | G06F 16/1774 |
| 11,400,378 | B2 * | 8/2022 | Dorn | A63F 13/75 |
| 11,967,154 | B2 * | 4/2024 | Li | G06V 20/52 |
| 2016/0328604 | A1 | 11/2016 | Bulzacki | |
| 2018/0173957 | A1 * | 6/2018 | Pavetic | G06F 16/7837 |
| 2018/0350144 | A1 * | 12/2018 | Rathod | H04L 51/10 |
| 2021/0271885 | A1 * | 9/2021 | Li | G06V 20/41 |
| 2021/0402304 | A1 * | 12/2021 | Dorn | A63F 13/493 |
| 2024/0257540 | A1 | 8/2024 | Mullen et al. | |
| 2025/0095374 | A1 * | 3/2025 | Li | G06N 20/00 |

OTHER PUBLICATIONS

Chan, et al. “Human motion classification using 2D stick-model matching regression coefficients”, pp. 70-89, ISSN 0096-3003, https://doi.org/10.1016/j.amc.2016.02.032. (Year: 2016).

International Searching Authority—International Search Report and Written Opinion for International Application No. PCT/US2021/019829, mailed May 27, 2021, 16 pages.

Ramzan, M., et al., “A Review on State-of-the-Art Violence Detection Techniques”, Retrieved from internet at ? https://ieeexplore.ieee.org/stamp/stamp.jsp?tp=&arnumber=8782115? vol. 7, Jul. 30, 2019, pp. 107560-107575.

Sultani, W., et al., “Real-world Anomaly Detection in Surveilance Videos”, 2018 Conference on Computer Vision and Pattern Recognition, retrieved from the internet at ?https://openaccess.thecvf.com/content_cvpr_2018/papers/Sultani_Real-World_Anomaly_Detection_CVPR_2018_paper.pdf?, 2018, pp. 6479-6488.

* cited by examiner

Solution Architecture (Overall)

*Local surveillance setup*
DVR Box/controller
Cameras/sensors

1. Continuous recording and extraction of clips on NVR,
2. Automated movement of extracted clips to Edge storage

OR

1. Live stream exposed/hosted by NVR
2. Each Edge device access respective live streams Each Edge device to process frames from respective camera feed (clips or live stream)

A local setup to measure the health and performance of Edge devices

*EDGE (95% Computation)*
Realtime/Batch data processing
At source/on premises
Basic stats
Data caching, buffering
Data filtering, optimization Jetson Nano Setup Controller + NUC + Storage

Cloud (5% Computation)
Advance processing
Complex business logic
Analytics & Data Visualization Edge devices to upload stats of process frames to cloud. Things like:
1. Video Name or Stream name
2. Time of day
3. frame number
4. Detection information with confidence score
5. Location of camera and metadata
6. Flags for alert/outlier etc.

Cloud hosted Dashboard to reflect analytics/metrics identified in Phase 1 based on stats provided by edge devices Ethernet
(Edge Devices connected to NVR box)

FIG. 5

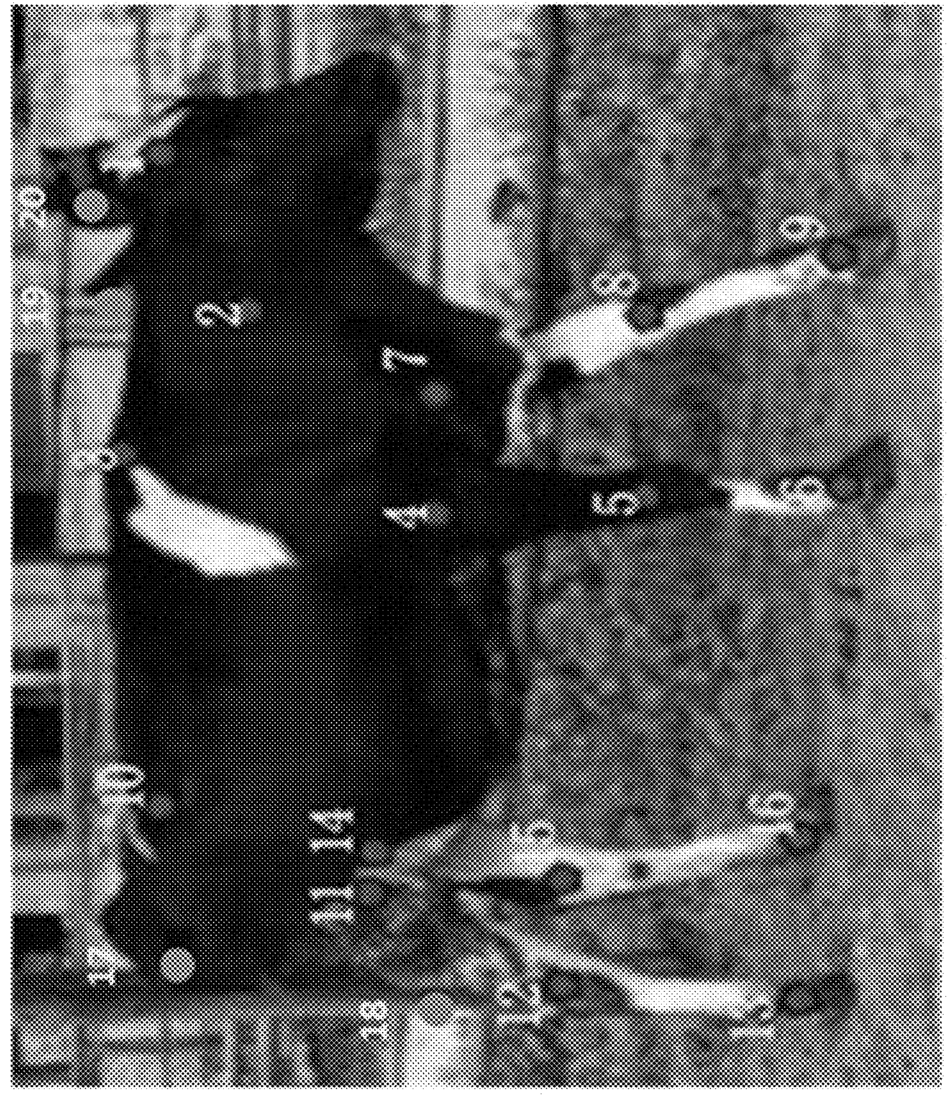
FIG. 10
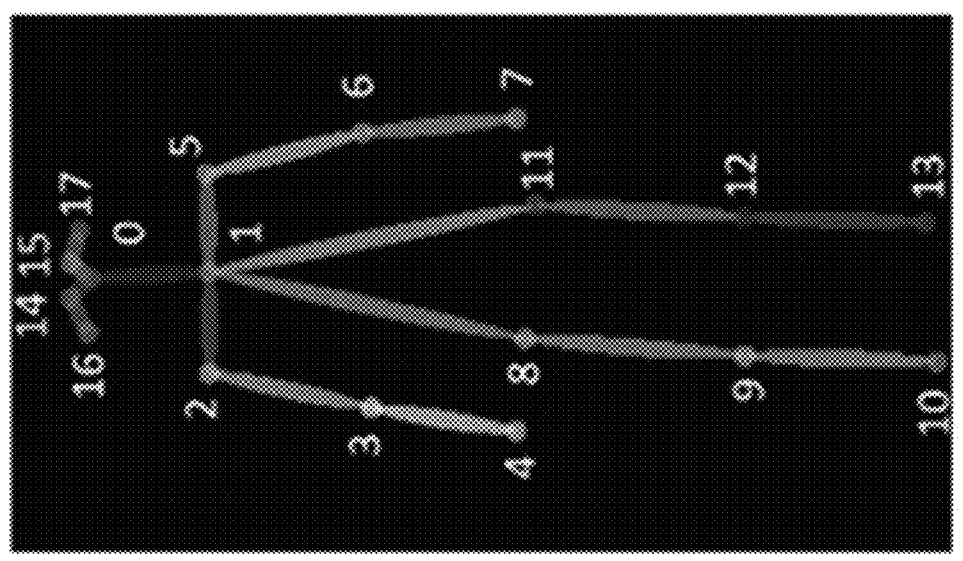

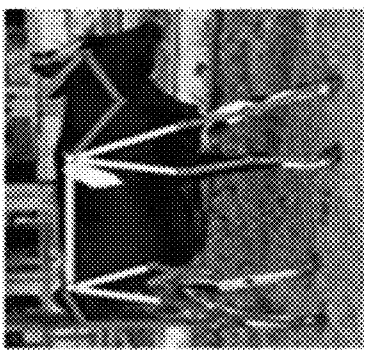
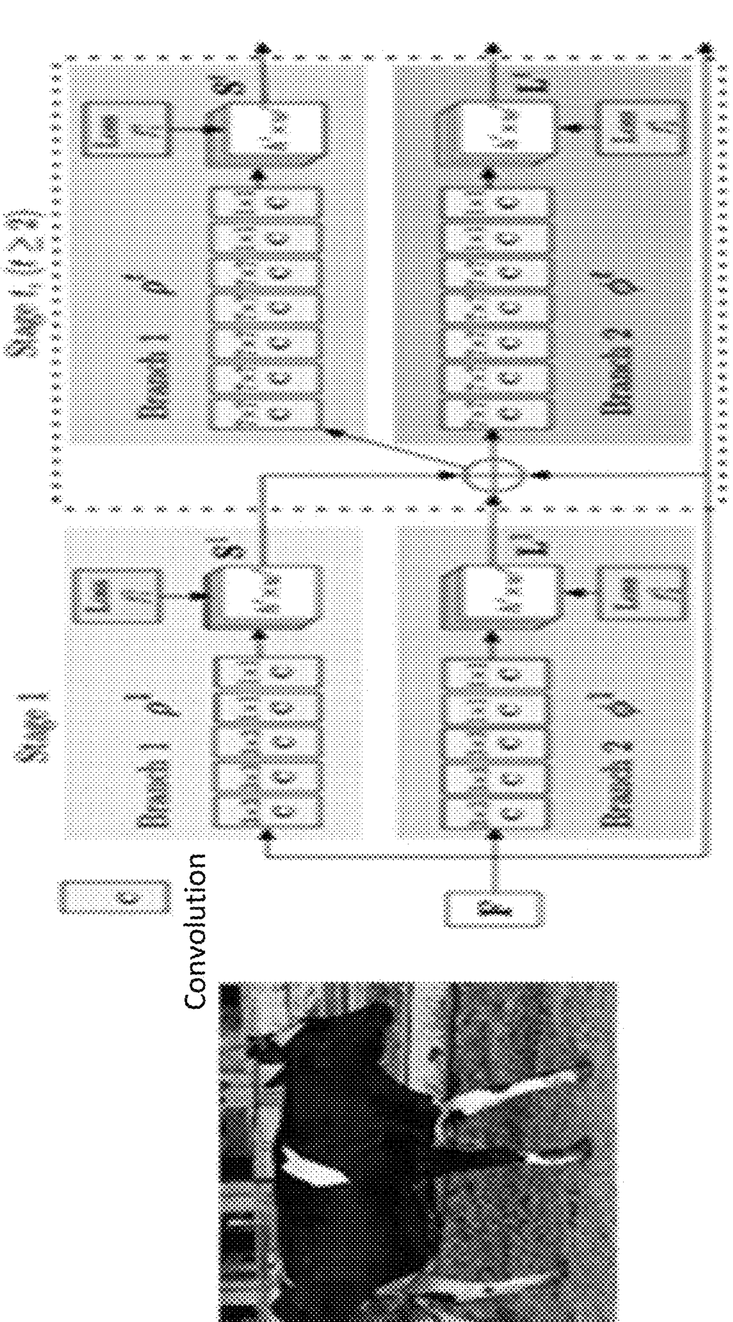
FIG. 11

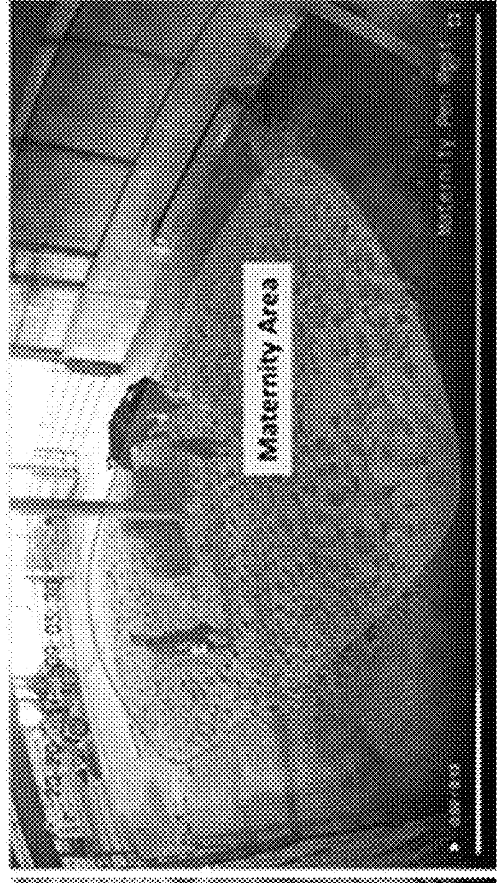
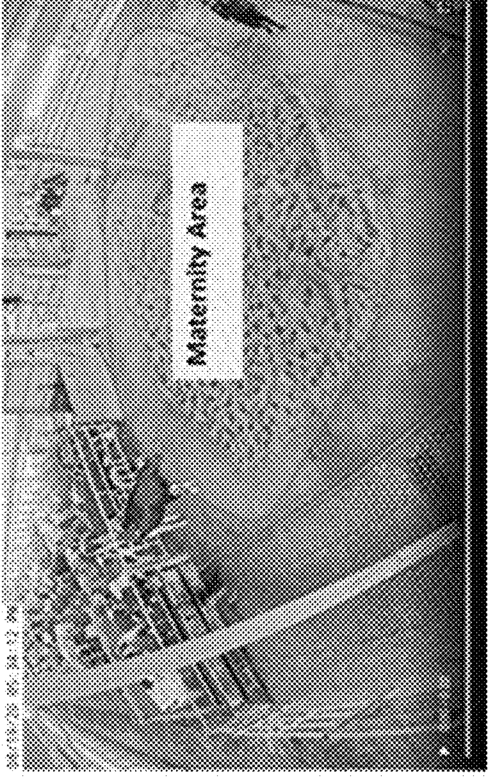
FIG. 22

VIDEO ANALYTICS TO DETECT INSTANCES OF POSSIBLE ANIMAL ABUSE BASED ON MATHEMATICAL MODELS

CROSS-REFERENCE TO RELATED APPLICATION(S)

This patent application is a continuation of U.S. patent application Ser. No. 17/186,497 entitled VIDEO ANALYTICS TO DETECT INSTANCES OF POSSIBLE ANIMAL ABUSE BASED ON MATHEMATICAL STICK FIGURE MODELS filed Feb. 26, 2021 (issuing as U.S. Pat. No. 11,967,154 on Apr. 23, 2024), which claims the benefit of U.S. Provisional Patent Application No. 62/982,966 entitled VIDEO ANALYTICS TO DETECT ANIMAL ABUSE filed Feb. 28, 2020, each of which is hereby incorporated herein by reference in its entirety.

FIELD OF THE INVENTION

The invention generally relates to video analytics to detect animal abuse such as in animal care facilities such as farms, zoos, breeders, etc.

BACKGROUND OF THE INVENTION

Animal abuse is a big problem on many animal care facilities such as farms, zoos, breeders, etc. Abusive treatment can include such things as workers hitting, kicking, stomping, stabbing, throwing, and force-feeding animals.

Video monitoring has been used at animal care facilities, but the sheer volume of video that is generated can be far more than humans can possibly review, especially when the number of cameras is large (e.g., on the order of 100+ cameras running 24/7). Furthermore, human review is inherently subjective as to what is, and what is not, animal abuse. There can be a fine line between abusive treatment and ethical treatment, because, for example, there are many cases in which a worker needs to physically move or constrain an animal, and movement and constraint can be done ethically even if it involves some level of force or some sort of tool (e.g., stick, shovel, bat, prod, feeding vessel, etc.).

SUMMARY OF VARIOUS EMBODIMENTS

In accordance with one embodiment of the invention, a video analytics system for detecting animal abuse comprises a controller coupled to receive video data from at least one camera, the controller comprising at least one hardware processor coupled to at least one tangible, non-transitory computer readable medium containing instructions executable by the at least one processor to cause the controller to process successive video frames to identify objects of interest including at least humans, create mathematical models of such objects, analyze movements of such objects relative to an animal, determine mathematically and objectively whether or not the analyzed movements meet predetermined criteria for possible abuse of the animal, and, when an instance of possible animal abuse is detected, output information identifying the instance of possible animal abuse via a user interface.

In accordance with another embodiment of the invention, there is provided a method for detecting animal abuse in a video analytics system comprising a controller coupled to receive video data from at least one camera, the controller comprising at least one hardware processor coupled to at least one tangible, non-transitory computer readable medium containing instructions executable by the at least one processor to cause the controller to perform computer processes comprising processing successive video frames to identify objects of interest including at least humans; creating mathematical models of such objects; analyzing movements of such objects relative to an animal; determining mathematically and objectively whether or not the analyzed movements meet predetermined criteria for possible abuse of the animal; and when an instance of possible animal abuse is detected, outputting information identifying the instance of possible animal abuse via a user interface.

In various alternative embodiments of such system and method, the controller may use artificial intelligence or machine learning techniques in the analysis process. The controller may perform the video analytics substantially in real-time on each of a number of video streams or clips. The controller may identify and model objects in the video via temporal and spatial modeling based on raw pixels. The controller may identify boundaries in an image from the raw pixels and identifies features of objects based on the boundaries, in which case the controller may track the features across multiple images to analyze movements of such objects and determine mathematically and objectively whether or not the analyzed movements meet predetermined criteria for possible abuse. The object may include humans, animals, and possible tools and weapons. The mathematical models may include stick-figure models, in which case the controller may analyze movements of such objects by analyzing movements of the stick-figure models. The predetermined criteria may be mathematical models defining ethical and unethical movements. The information identifying the instance of possible animal abuse may include at least one of a video clip showing the instance of possible animal abuse, a link to a portion of a video showing the instance of possible animal abuse, or information including a camera identifier, day, and time. The controller may assign a probability score to each instance of possible animal abuse and allows the user to view video clips showing instances of possible animal abuse based on the probability scores.

Additional embodiments may be disclosed and claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Those skilled in the art should more fully appreciate advantages of various embodiments of the invention from the following "Description of Illustrative Embodiments," discussed with reference to the drawings summarized immediately below.

FIG. 5 is a schematic diagram showing relevant components of a video analytics system, in accordance with one exemplary embodiment.

FIG. 10 shows a processed video frame demonstrating stick figure definition of a human and a cow, in accordance with an alternative exemplary embodiment.

FIG. 11 shows examples of using deep neural network to predict a cow's feature points and skeleton, in accordance with an alternative exemplary embodiment.

FIG. 22 shows another example of a marked area of interest.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Figure 1A:
FIGS. 1A-1C are a progression of processed video frames in which a worker beats a cow over the head with feeding bottle, in accordance with one exemplary embodiment.

Embodiments of the present invention perform video analytics to evaluate interactions between humans and animals and identify possible occurrences of animal abuse or other wrongdoing (referred to hereinafter generically as animal abuse) in an objective manner. Specifically, the video analytics system processes successive video frames to identify objects of interest (e.g., humans, animals, tools/weapons, etc.), creates mathematical models of such objects (which, in certain exemplary embodiments, are essentially stick-figure models), analyzes movements of such objects (e.g., the speed and/or directional motion of an object or portion of an object such as an arm or leg), determines mathematically and objectively whether or not the analyzed movements meet predetermined criteria for possible abuse (e.g., wherein the predetermined criteria can be mathematical models defining ethical and unethical movements), and outputs relevant information via a user interface (e.g., a list of possible abuse instances identifying the time and probability of possible abuse, from which the user can select an instance in order to view the corresponding video for human analysis). Artificial intelligence and machine learning techniques can be used in the analysis process. In certain exemplary embodiments, such video analytics can be performed substantially in real-time on each of a number of video streams.

Video Analytics to Detect Animal Abuse

In exemplary embodiments, the video analytics system identifies and models objects in the video via temporal and spatial modeling based on raw pixels. The video analytics system can identify boundaries in an image from the raw pixels and can identify objects (e.g., a person's arms, legs, torso, head, etc.) based on the boundaries. The video analytics system creates a mathematical model of the objects in the image, e.g., the features of a person, the features of an animal, etc. The video analytics system then tracks the features across multiple images to analyze movements of such objects (e.g., the speed and/or directional motion of an object or portion of an object such as an arm or leg) and determine mathematically and objectively whether or not the analyzed movements meet predetermined criteria for possible abuse.

In one exemplary prototype system, the video analytics system only tries to model humans and human movements to determine whether or not such movements reflect possible abusive behavior, although alternative embodiments can model both humans and animals and their movements and interactions. Specifically, in this exemplary embodiment, the video analytics system identifies patterns that suggest a human. Among other things, modeling only humans and human movements simplifies the processing while still providing insight into possible abusive behavior. This can be particularly useful in situations where video is processed in real-time and on-site at the animal care facility, as opposed to, say, processing stored video at a later time using cloud-based processing, which is not always possible in remote farming locations.

Figure 1B:
Figure 1C:
Figure 2A:
FIGS. 2A-2D are a progression of processed video frames in which a worker forcefully throws a cow into a vehicle, in accordance with one exemplary embodiment.
Figure 2B:
Figure 2C:
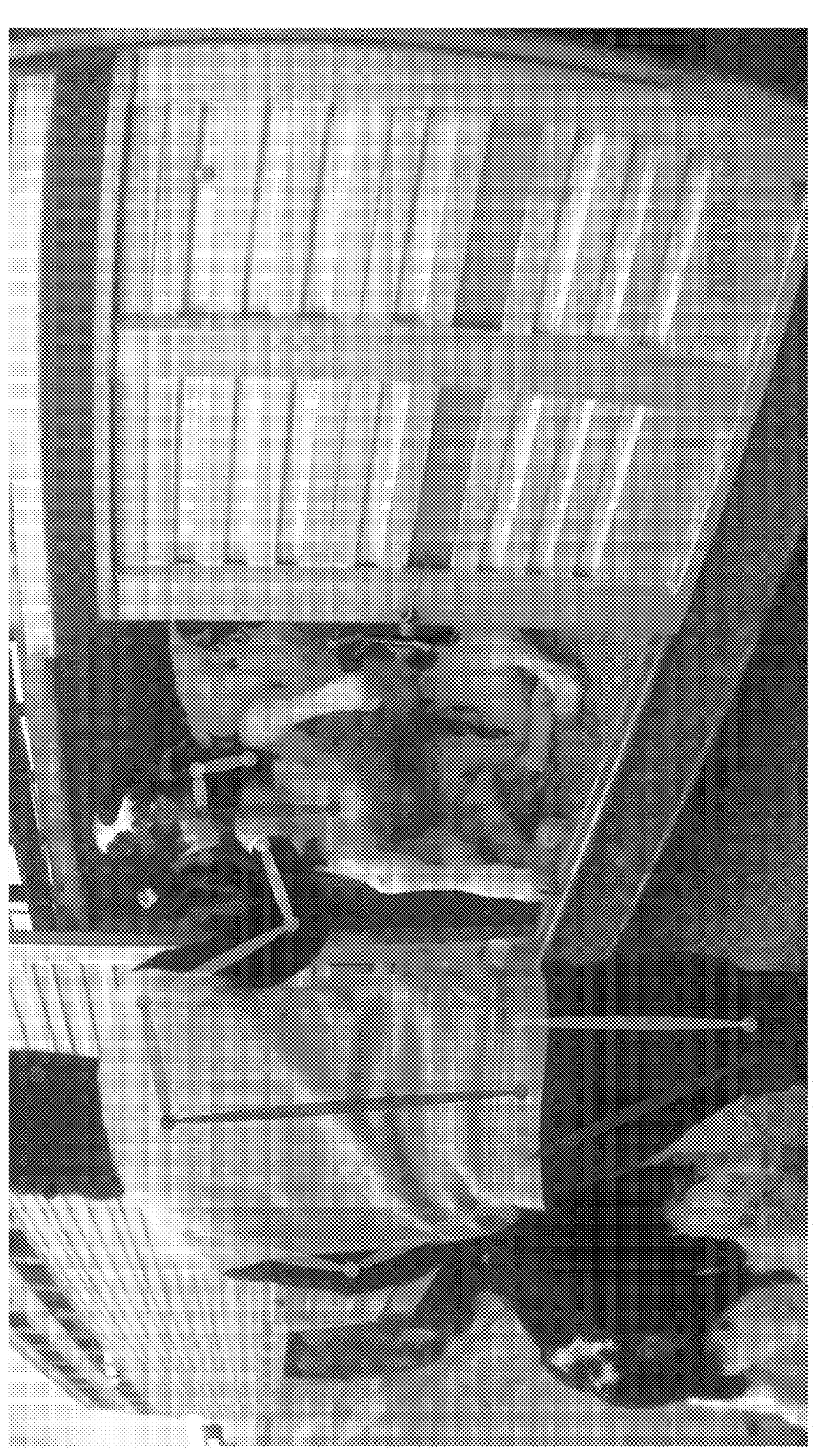
Figure 2D:

FIGS. 1A-1C are a progression of processed video frames in which a worker beats a cow over the head with feeding bottle. In this example, the system identifies two patterns in FIG. 1A that are interpreted as possible humans (one of which is actually a human on the righthand side and the other of which is a pattern of light and dark created by two cows standing next to each other), the system identifies two patterns in FIG. 1B that are interpreted as possible humans (one of which is the actual human in FIG. 1A and the other of which is a pattern involving the interplay of pixels between a housing pen and a cow), and the system identifies two patterns in FIG. 1C that are interpreted as possible humans (one of which is the actual human in FIGS. 1A-1B and the other of which is a continuation of the second pattern in FIG. 1B). The video analytics system can analyze the movements of the stick figure features (e.g., the yellow forearm segment, which moves downward in a striking motion from FIG. 1A to FIG. 1B to FIG. 1C) to determine whether or not the movements suggest a possible abuse (in this case, beating the cow) as opposed to, say, gently reaching down to hold the cow's head.

FIGS. 2A-2D are a progression of processed video frames in which a worker forcefully throws a cow into a vehicle. In this example, the system identifies two patterns in FIG. 2A that are interpreted as possible humans (one of which is actually a human on the lefthand side and the other of which is a pattern of light and dark created by a cow), the system identifies one pattern in FIG. 2B that is interpreted as a possible human (the actual human in FIG. 2A), the system identifies three patterns in FIG. 2C that are interpreted as possible humans (one of which is the actual human in FIGS. 2A-2B and the other of which are patterns of light and dark created by the cow), and the system identifies two patterns in FIG. 2D that are interpreted as possible humans (one of which is the actual human in FIGS. 2A-2C and the other of which is a pattern of light and dark created by the cow). The video analytics system can analyze the movements of the stick figure features (e.g., the torso and arm movements) to determine whether or not the movements suggest a possible abuse (in this case, forcefully throwing the cow) as opposed to, say, gently placing the cow in the vehicle.

Figure 3A:
FIGS. 3A-3B are a progression of processed video frames in which a worker hits the cow in the mouth with feeding bottle, in accordance with one exemplary embodiment.
Figure 3B:
Figure 4A:
FIGS. 4A-4E are a progression of processed video frames in which a worker stomps on a cow with his knee, in accordance with one exemplary embodiment.
Figure 4B:
Figure 4C:
Figure 4D:
Figure 4E:

FIGS. 3A-3B are a progression of processed video frames in which a worker hits the cow in the mouth with feeding bottle. In this example, the system identifies one pattern in FIGS. 3A-3B that is interpreted as a possible human. The video analytics system can analyze the movements of the stick figure features (e.g., the downward movement of the yellow forearm segment and orange upper arm segment) to determine whether or not the movements suggest a possible abuse (in this case, hitting the cow) as opposed to, say, gently placing the feeding bottle in the cow's mouth.

FIGS. 4A-4E are a progression of processed video frames in which a worker stomps on a cow with his knee. In this example, the system identifies four patterns in FIGS. 4A-4E that are interpreted as possible humans. The video analytics system can analyze the movements of the stick figure features (e.g., the leg and body movements of the human on the righthand side of the images) to determine whether or not the movements suggest a possible abuse (in this case, stomping on the cow) as opposed to, say, gently constraining the cow with his leg, which may be ethical.

FIG. 5 is a schematic diagram showing relevant components of a video analytics system, in accordance with one exemplary embodiment. Among other things, the video analytics system includes a local surveillance setup, a number of local edge computing systems, and a cloud-based system. The local surveillance setup provides video to the edge computing systems, e.g., by recording video and providing extracted video clips to the edge computing system, or by providing live streaming video to the edge computing system. The edge computing system stores video streams/clips and processes video frames. The edge computing system can upload information to the cloud-based system, which can provide a cloud-based user interface (e.g., dashboard) and can perform additional video processing. In an exemplary embodiment, the edge computing system performs almost all of the video processing operations, which allows the operator to avoid costly fiber internet connectivity and enables potential global deployment even to locations with low-bandwidth services such as 4G wireless. The exemplary system orchestrates workflows for video review and archives videos and video metadata. Video streams/clips is analyzed by an edge computing system, e.g., using machine learning algorithms and orchestration software. Instances of possible abuse, which in an exemplary embodiment are represented by predefined numerical thresholds, are detected locally at the animal care facility, then sent to the dashboard interface of the cloud-based system along with critical metadata such as the facility location, time of day, and camera or camera location. The dashboard can display aggregated metrics, e.g., per camera, per day, per facility, per location, etc. Without limitation, these aggregated metrics can include one or more of length of video, number of animal-human co-exists, number of animal-human interactions, number of likely abuse instances, historical metrics, and trends. Likely instances of abuse may be flagged for urgent review, such as, for example, by sending SMS notifications to supervisors.

It is recognized that the performance of the computer vision and AI may vary based on challenging image conditions. To mitigate these risks, exemplary embodiments can use active learning to continuously monitor the performance, retrain, and upgrade the model. The nature of these challenging image conditions includes such things as:

- the video data used for training and testing the algorithm may be limited in locations, period of time, and animal types; and
- the video/image quality may be affected by many factors, including but not limited to the lighting condition, weather, day/night, new types of animals that are not seen in the training data, and different colors of animals that are not seen in the training data.

Further, the definition of "abuse" is subjective, and the model can miss certain possible abuse cases or over-report possible abuse cases (i.e., false alarms). To mitigate the risk, feedback can be used to refine the system, adjust the thresholds, and use likelihood instead of absolute (0/1) abuse reporting.

Figure 6:
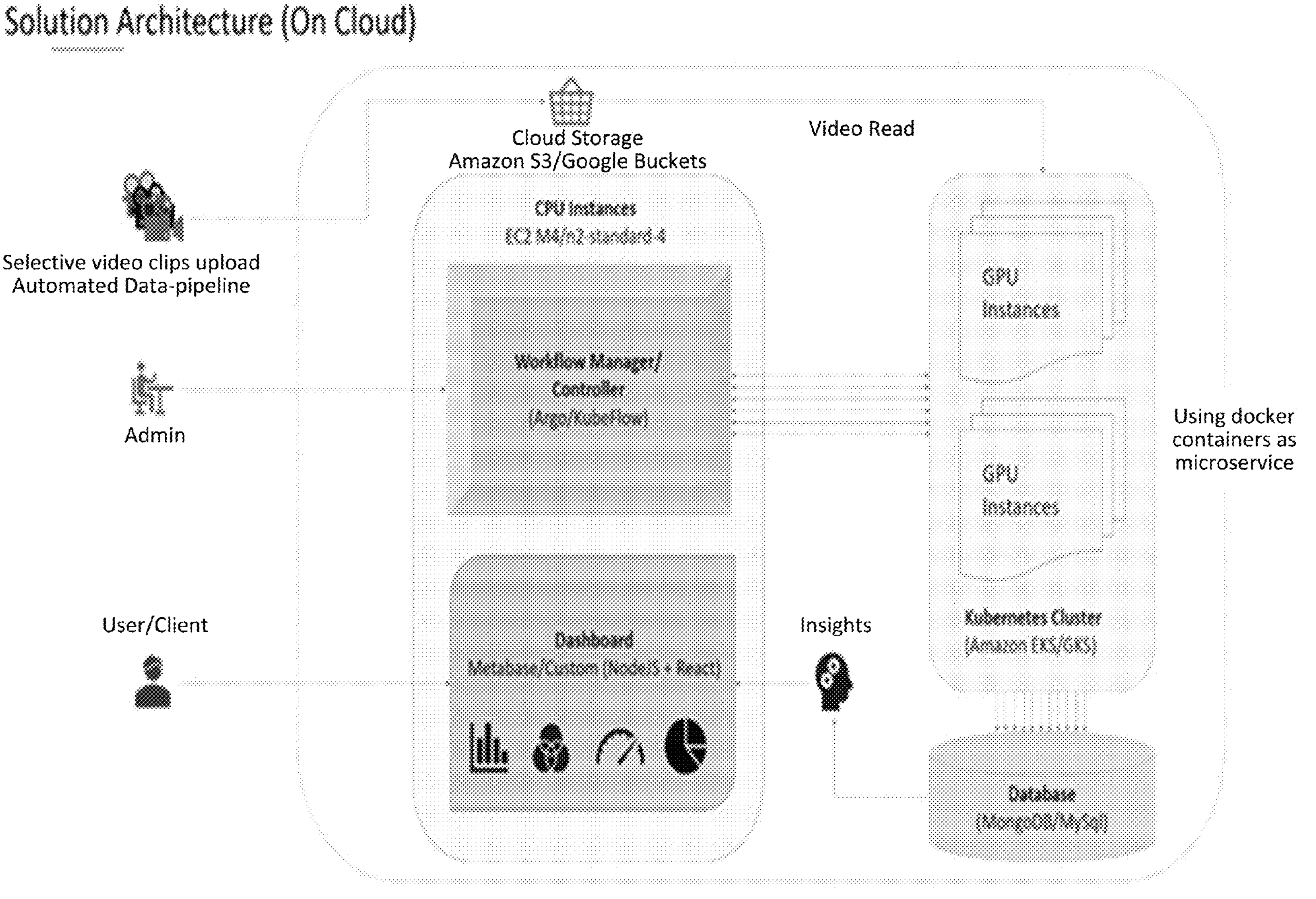
FIG. 6 is a schematic diagram showing relevant components of the cloud-based system of FIG. 5, in accordance with one exemplary embodiment.

FIG. 6 is a schematic diagram showing relevant components of the cloud-based system of FIG. 5, in accordance with one exemplary embodiment. Among other things, the cloud-based system includes a workflow manager/controller and a dashboard through which a user can view videos or video clips identified by the system as containing possible instances of abuse or other wrongdoing. For example, the system may present a list of videos or video clips that the user can select (e.g., by clicking on a video clip or link).

Figure 7:
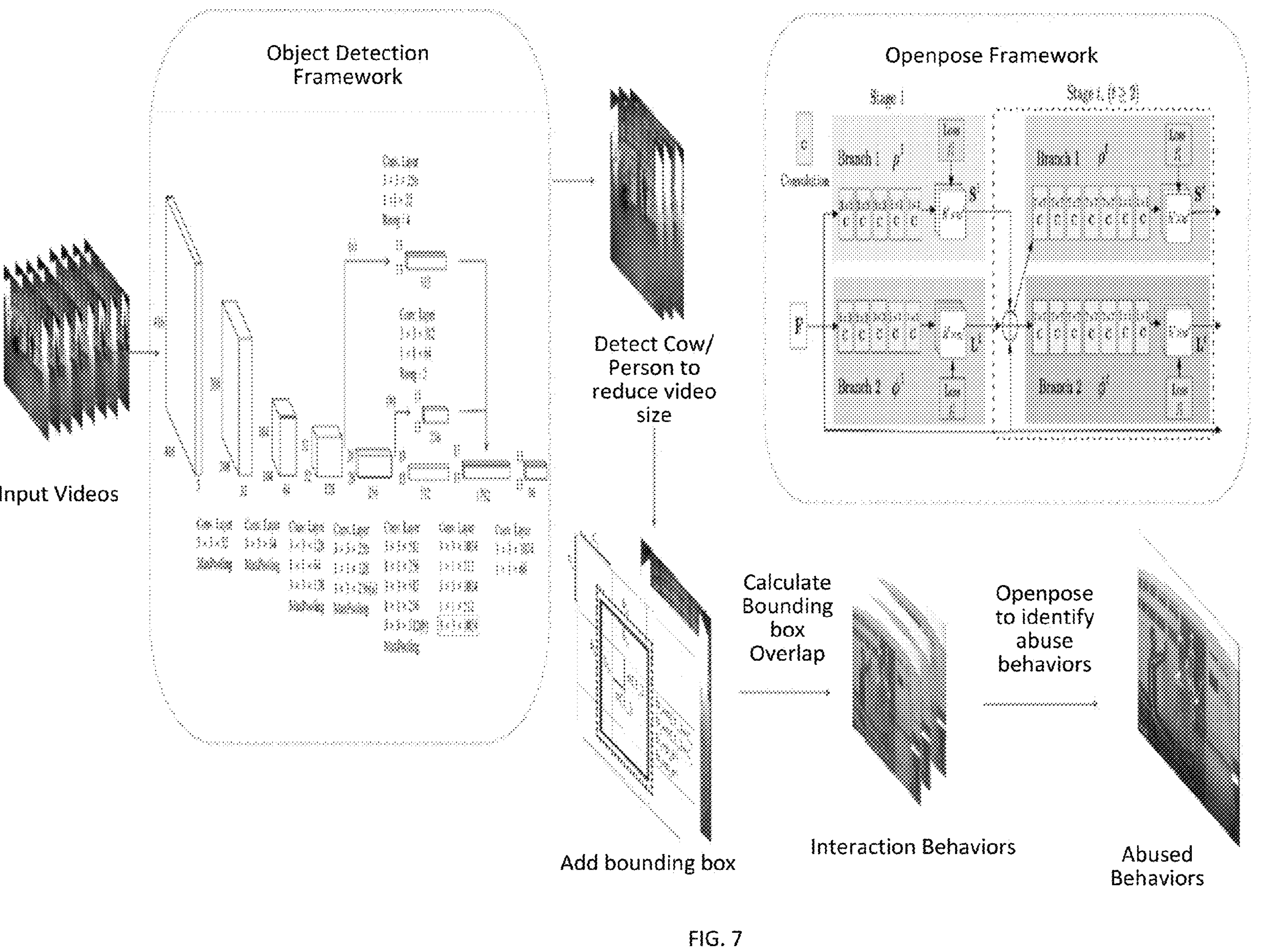
FIG. 7 is a schematic diagram showing AI-based video processing to identify possible instances of animal abuse.

FIG. 7 is a schematic diagram showing AI-based video processing to identify possible instances of animal abuse. Among other things, the AI-based video processing includes object detection (e.g., to identify humans and animals), interaction detection (e.g., to identify interactions between humans and animals), and motion detection (e.g., to detect instances of possible animal abuse based on movements of humans and/or animals).

In one alternative exemplary embodiment, the video analytics system models humans, animals, and human/animal movements and interactions, and further differentiates between different classifications of animals and their interactions with humans. In this exemplary embodiment, animal abuse can include such things as battering (e.g., kicking, hitting), assaulting (e.g., screaming or using aggressive body language or movements), or forcefully moving the animal (e.g., pushing, pulling, or throwing the animal, especially by the tail, ears, or leg), and/or other appropriate or agreed-upon definition of abuse (e.g., in consultation with a particular farm or animal care/oversight organization). In one particular exemplary embodiment, the video analytics system specifically differentiates between humans, cows, and calves in order to provide additional scrutiny to human-calf interactions due to the vulnerability of calves in a dairy farm environment, which need to be treated gently, calmly, and with a lot of patience. The video analytics system can be configured to perform similar analysis on different types of animals (e.g., differentiate between dogs and puppies, cats and kittens, goats and kids, pigs and piglets, etc.) and also to differentiate between more than two classifications of animals (e.g., differentiate between adult, adolescent, and baby animals), which in some cases may need to be treated differently. The video analytics system also can be configured to differentiate between male and female animals, which in some cases may need to be treated differently.

Considering the above issues, the video analytics system focuses on detecting the following three aspects:

1) Detecting calves and ways that calves are handled and reporting any mishandling to an operator.
2) Detecting unnecessarily fast human movements (as a dairy farm is a slow environment) and reporting any unnecessarily fast movements to an operator.
3) Detecting any sensitive parts of cows/calves as well as human interaction with these parts and reporting any suspicious interactions to an operator.

Figure 8:
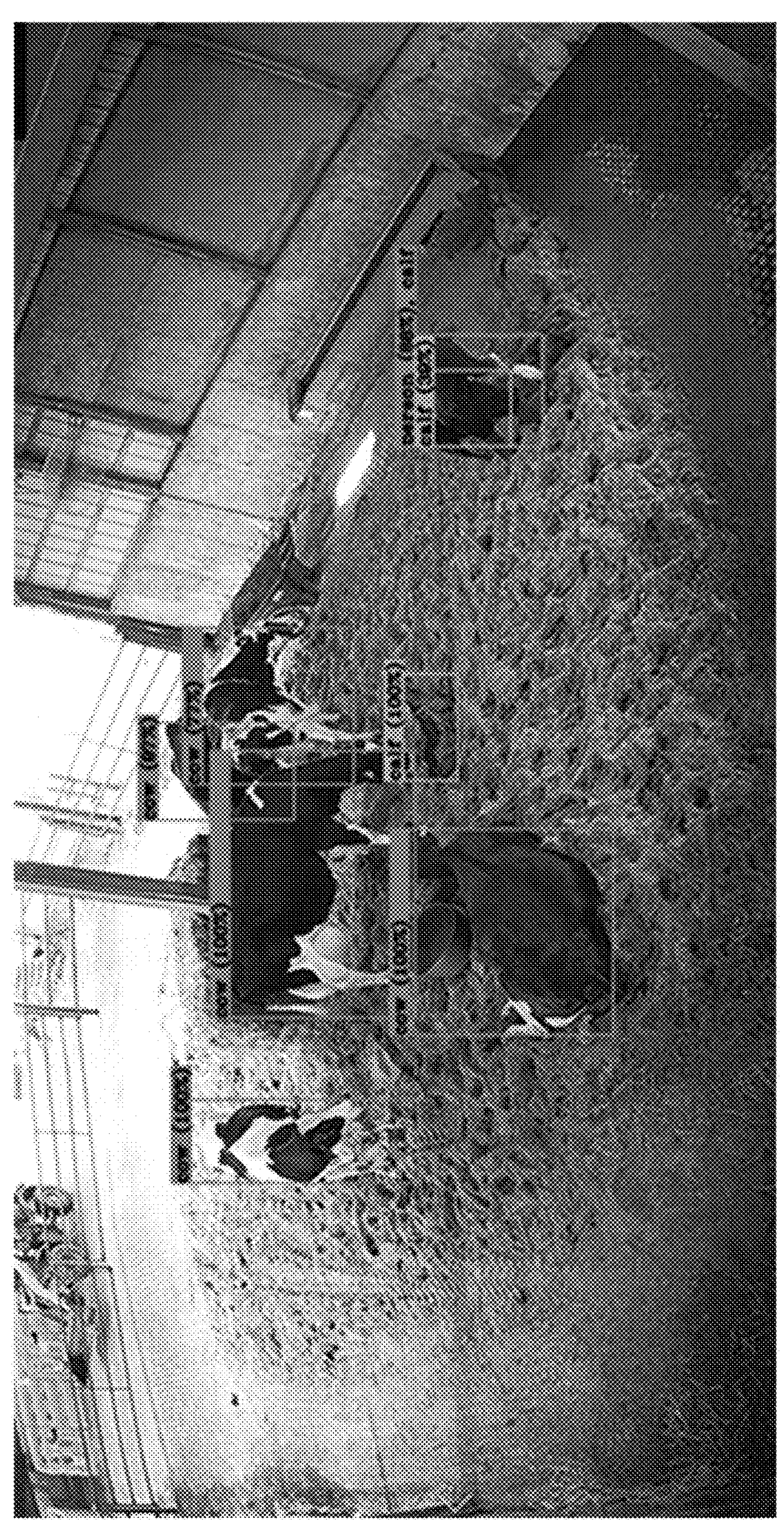
FIG. 8 shows a processed video frame demonstrating human/cow/calf detection, in accordance with an alternative exemplary embodiment.
Figure 9:
FIG. 9 shows a processed video frame demonstrating object tracking and human/cow and human/calf interaction detection, in accordance with an alternative exemplary embodiment.
Figure 12:
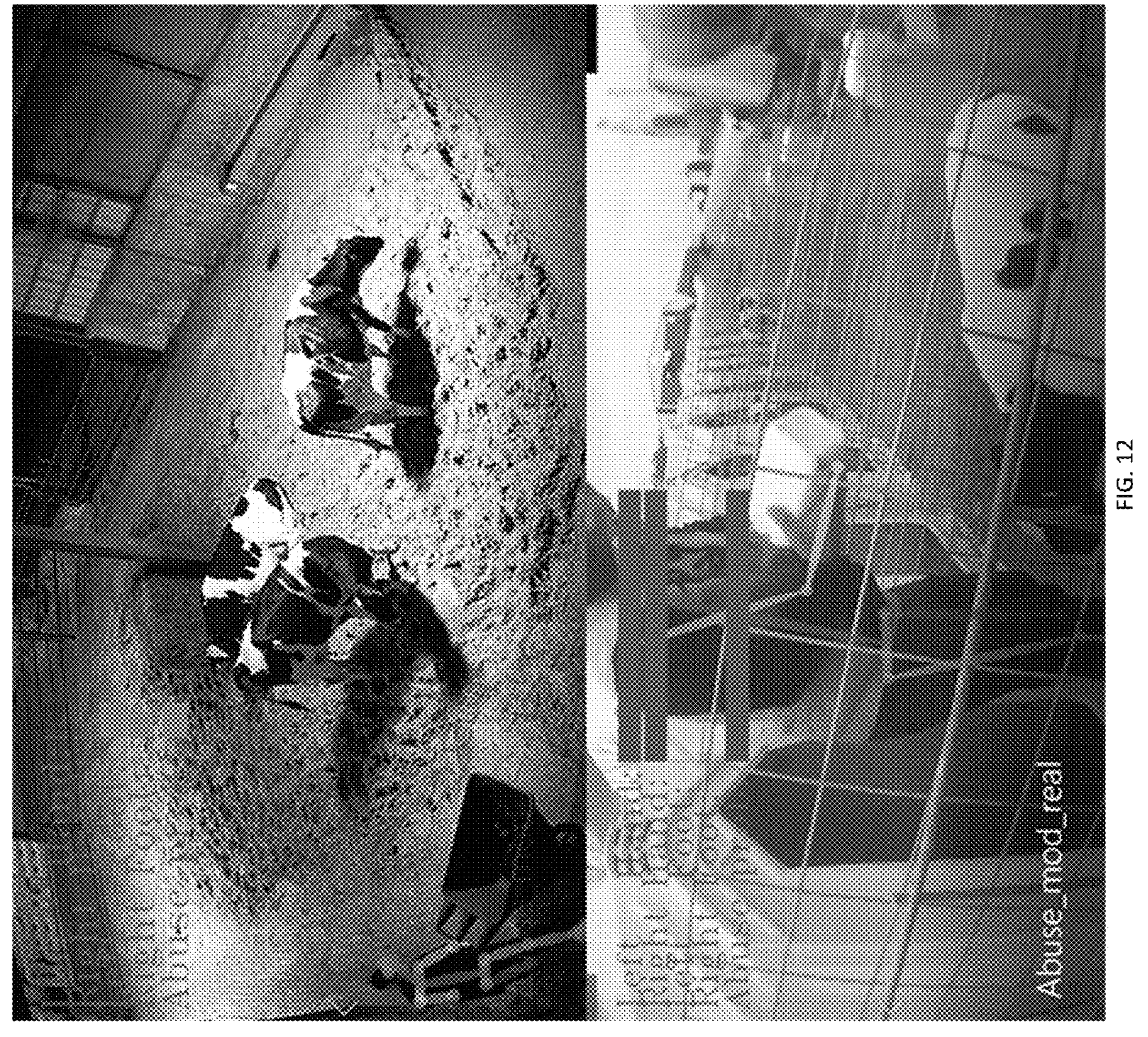
FIG. 12 shows examples of using motion speed to estimate possible abuse.

Some exemplary methods to achieve the above goals are illustrated in the FIGS. 8-10. In this exemplary embodiment, the video analytics system uses a custom deep neural network to detection humans, cows, and calves. As shown in FIG. 8, detected people are highlighted with pink color, detected cows are highlighted with blue color, and detected calves are highlighted with green color. After detecting humans, cows, and calves, the video analytics system tracks the humans, cows, and calves so the same human/cow/calf can be grouped with the same identity across the temporal frames. As shown in FIG. 9, the number in each object represents the identity of the object. In this exemplary embodiment, abuse is defined by interactions between human/cow and/or human/calf, so, after identifying and grouping humans/cows/calves, the video analytics system performs interaction detection. As shown in FIG. 9, the yellow translucent color represents human/cow interaction, and the red translucent color represents human/calf interaction. If interaction is detected, the video analytics system performs stick model analysis only on the interaction part. To accomplish this, the video analytics system first defines the features points of the human and the cow/calf, for example, through training of a custom deep neural networks to predict the feature points and skeletons of the humans and cows/calves. FIG. 10 shows an example of feature points defined for a human and for a cow, respectively. FIG. 11 shows an example of using deep neural network to extract features points and skeletons of a cow. For humans, a separate network with similar structure is trained. After extracting the features points of skeletons of human and cows/calves, the video analytics system estimates the moving speed of the human's hands and legs, since the movement speeds of hands and legs are important indicators of possible abuse. As shown in FIG. 12, the movement speeds of human's hands and feet are indicated. The green color represents safe movement speed, while red color represents fast movement speed and indicates possible abuse that is reported to the operator. If the human's hands and feet are determined to touch sensitive areas of the cow/calf, such as tails, ears, the video analytics system also will report such touching.

It should be noted that the video frames in the above examples show the stick figure mathematical models and other indicia superimposed on the original video frames, which is useful for demonstration purposes. Also, such superimposed video frames can be stored for later presentation to the operator, such as when the user selects an instance of possible abuse in order to view the corresponding video for human analysis. Alternatively, embodiments need not store superimposed video frames or present superimposed video frames to the operator but rather, for example, the video analytics system can use the models internally to evaluate possible instances of abuse and then present the original video frames such as when the user selects an instance of possible abuse in order to view the corresponding video for human analysis.

Video Event Ranking

Systems of the types described above can output hundreds of relevant video events, which could take users many hours to review. However, users generally want to spend a limited amount of time reviewing video events (e.g., 30 minutes a day) and therefore want to focus on the videos most likely to show abuse or impropriety. Therefore, certain exemplary embodiments include a scoring algorithm that assigns a probability score to each video, where the probability score represents a probability of abuse or impropriety and can be used to measure the relevance of the video event. Videos then can be ranked and viewed based on the probabilities. In this way, users can view the videos with the highest scores to save review time.

In certain exemplary embodiments, the probability score is computed based on the following factors:

1) Motion of the people when in people/animal interaction
2) The accident types

The formula used in certain exemplary embodiments is:

relevant_score=motion_score+sum (Wi*accident_Type_i)

The relevant score is normalized between (0, 1).

Motion Score Calculation

In certain exemplary embodiments, the system uses the following steps to calculate the motion score for human/animal interaction. First, the feature points of humans are extracted as discussed above. Then, the system tracks the feature points from frame-to-frame. For the same tracked feature point between two frames Ti and Tj having coordinates (Xi, Yi) and (Xj, Yj), respectively, the speed of this feature point can be calculated as:

$$\text{Speed} = (|Xi - Xj| + |Yi - Yj|)/(Tj - Ti)$$

In certain exemplary embodiments, the moving speed of this person is computed as the average speed of all tracked feature points, although moving speed can be calculated in other ways in various alternative embodiments.

Figure 13:
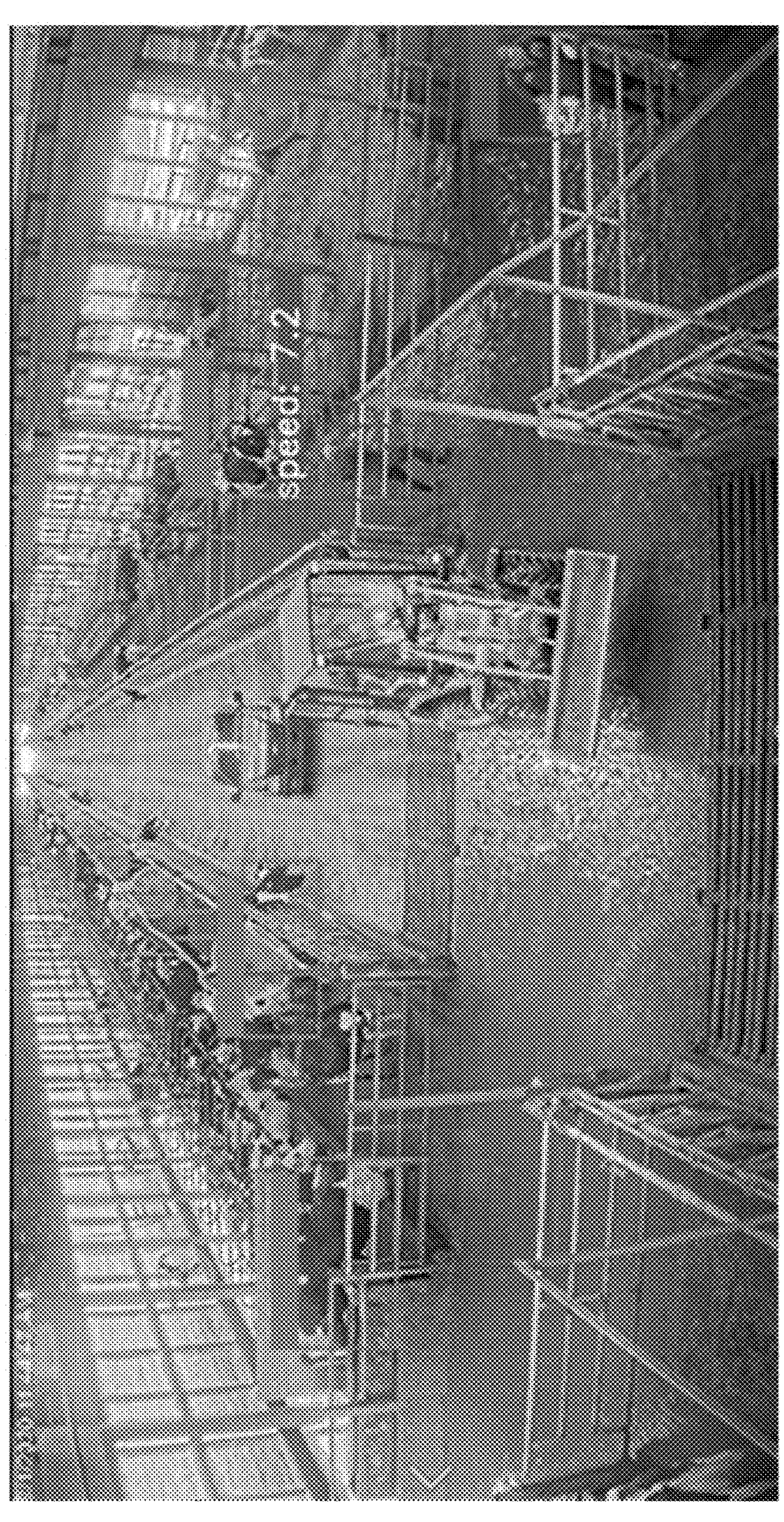
FIG. 13 provides an example of motion speed calculation, in accordance with one exemplary embodiment.

FIG. 13 provides an example of this motion speed calculation. Here, two persons are detected and are highlighted here with red bounding box over them. The person in the right bottom corner will not be calculated, since there is no human/animal interaction. We will only calculate the person in the middle of the frame since only this person has an interaction with the cow. The person in the right bottom corner did not generate any interactions. The red dots show the example of extracted feature points. These feature points are tracked, and the motion speed is calculated (in this case, the motion speed is is calculated as 7.2).

Feature points (i.e., the red dots in the figures discussed above) can be tracked in a number of ways. Certain exemplary embodiments use optical flow to compute motion speed but with compensation for perspective and distance. Specifically, the optical flow method will compute motion speed in the unit of pixels. However, due to the perspective, objects far away from the camera generally will show slower motion than those close to the camera. Thus, for the same person, walking far away from the camera will have less motion speed than that of walking close to the camera even though the person is walking at the same speed. For cameras on a farm (and in other contexts), usually if a person appears in the top of the frame, the person is far away from the camera, and if the person appears in the bottom of the frame, the is close to the camera. Thus, certain exemplary embodiments use the y-coordinate of a person bounding box to roughly measure the distance of that person, for example, using the following formulas to adjust the speed:

$$\text{adjust factor} = 0.5 + \frac{y \text{ coordinate}}{\text{frame height}}$$

$$\text{speed adjusted} = \frac{\text{original speed}}{\text{adjust factor}}$$

From these two formulas, it can be seen that the system increases the speed if the person is far away from the camera and decreases the speed if the person is close to the camera.

After the motion speed of a person is calculated, certain exemplary embodiments then map this speed to a score. In certain exemplary embodiments, the probability is calculated as follow:

$$prob = \frac{\text{event speed} - \text{speed lower bound}}{\text{speed upper bound} - \text{speed lower bound}}$$

After mapping the prob will be a value between (0, 1).

Relevance Score from Specific Events

The motion speed is an important indicator. In some cases, the person may act quickly but without aggressive action, while in other cases, the person may act slowly but with an aggressive or impermissible action (e.g., failing to follow the farm protocol). Therefore, in certain exemplary embodiments, the system adjusts the relevant probability based on an evaluation of the type of incident or activity that may indicate abuse or violation of protocols, such as, for example (and without limitation):

1) Improper handling calves (e.g., if a person holds legs of a calf and/or pulls/drags/throws the calf);
2) Employees use gate, stick, or other weapons to move the cow
3) A cow is down from working area
4) The rotary stops rotating
5) Euthanasia
6) A group of people gathering together
7) People removing carcass Thus, in certain exemplary embodiments, each time a certain type of incident is detected in a particular video sequence, the system increases the probability score, e.g., by adding a predetermined amount (e.g., 10%) to the probability score. In this way, as the number of incidents increases, the probability score correspondingly increases.

Figure 14:
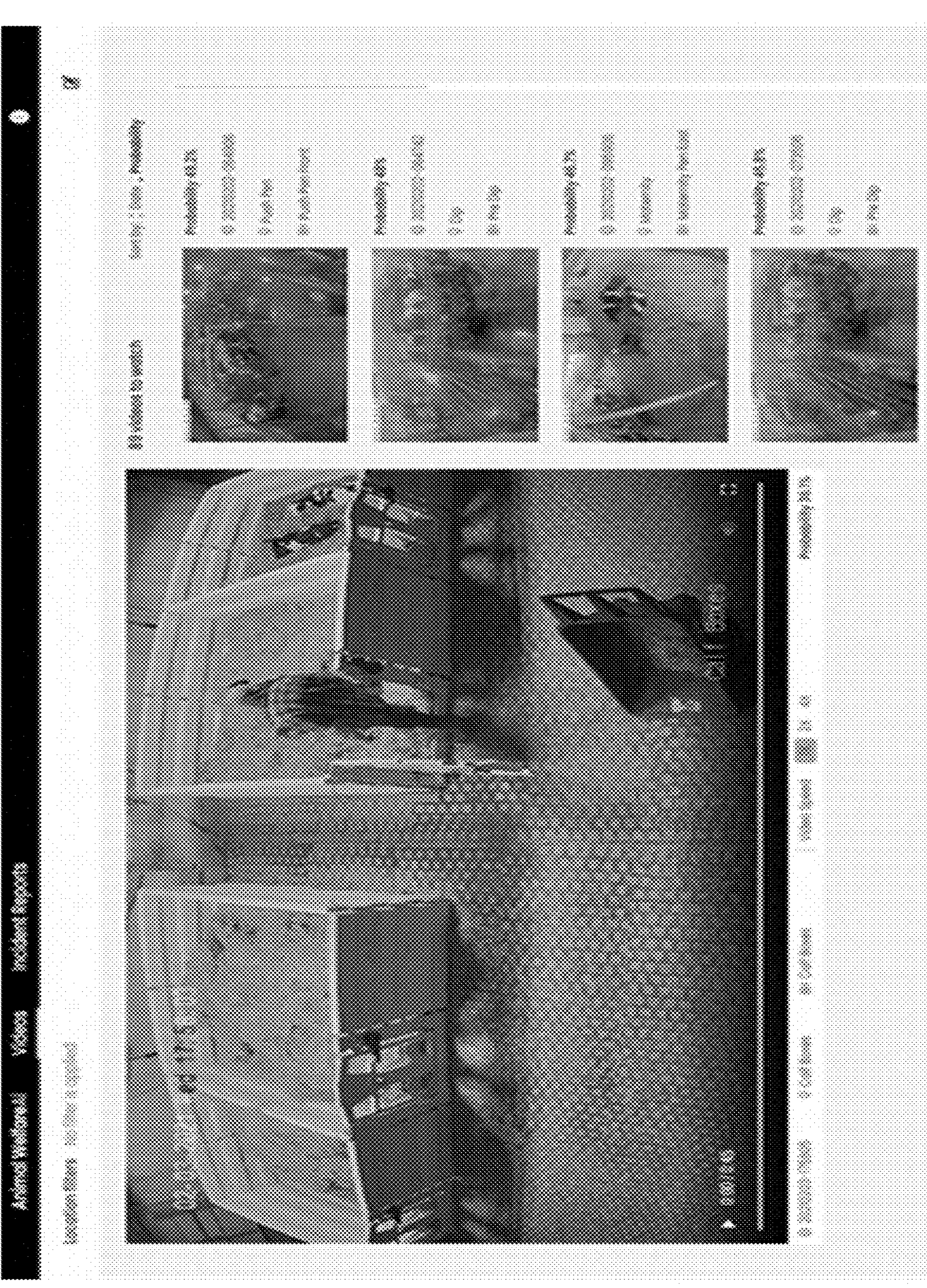
FIG. 14 shows an example user interface screen with ranked videos listed on the right side based on probability scores, in accordance with one exemplary embodiment.

FIG. 14 shows an example user interface screen with the ranked videos listed on the right side based on probability scores. In this way, the user can watch videos starting with the videos having the highest probability score and can reduce the amount of watching time per day, e.g., to around 30 minutes a day.

To further improve usability to facilitate the video reviews, certain exemplary embodiments allow videos to be sorted, for example, by date and probability. This feature can help the user with focusing on finding and watching videos based on their preference.

Figure 15:
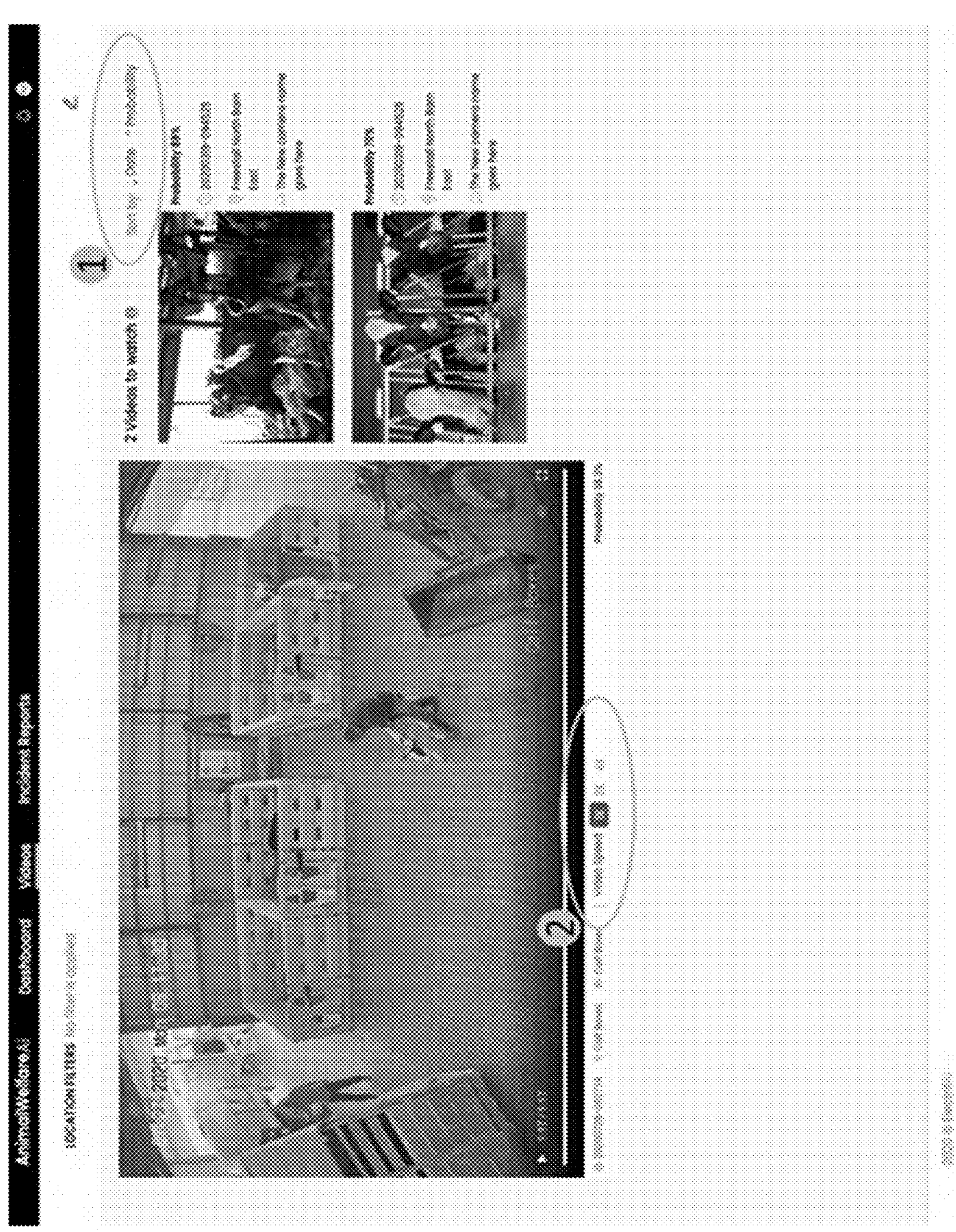
FIG. 15 shows an example user interface screen highlighting the ability to sort videos by probability score and the ability to select viewing speed, in accordance with one exemplary embodiment.

As shown in FIG. 15, certain exemplary embodiments allow users to watch videos sorted by probability (item 1) and/or at various speeds (e.g., 1×, 2×, 4×, etc.—item 2).

Extra Accident Types

It should be noted that certain exemplary embodiments do not only detect and highlight abuse but also can detect and highlight other types of activities that are not necessarily abuse. For example, farm managers may want to see other types of activities, e.g., to ensure that employees are following protocols or to use for educating employees regarding protocols (e.g., what to do and what not to do). When these accident types happen, certain exemplary embodiments will increase the probability score to raise the priority of the video.

Figure 16:
FIG. 16 shows an employee using a gate as a weapon to squeeze or hit a cow so the cow will move forward.

FIG. 16 shows an employee using a gate as a weapon to squeeze or hit a cow so the cow will move forward. In this example, the system detects gate movement, calculates gate moving speed, and determines if the gate hits the cow and if so determines how hard/fast the gate hits the cow. If the gate hits the cow with extra speed, then the probability score is increased to raise the priority of the video.

Figure 17:
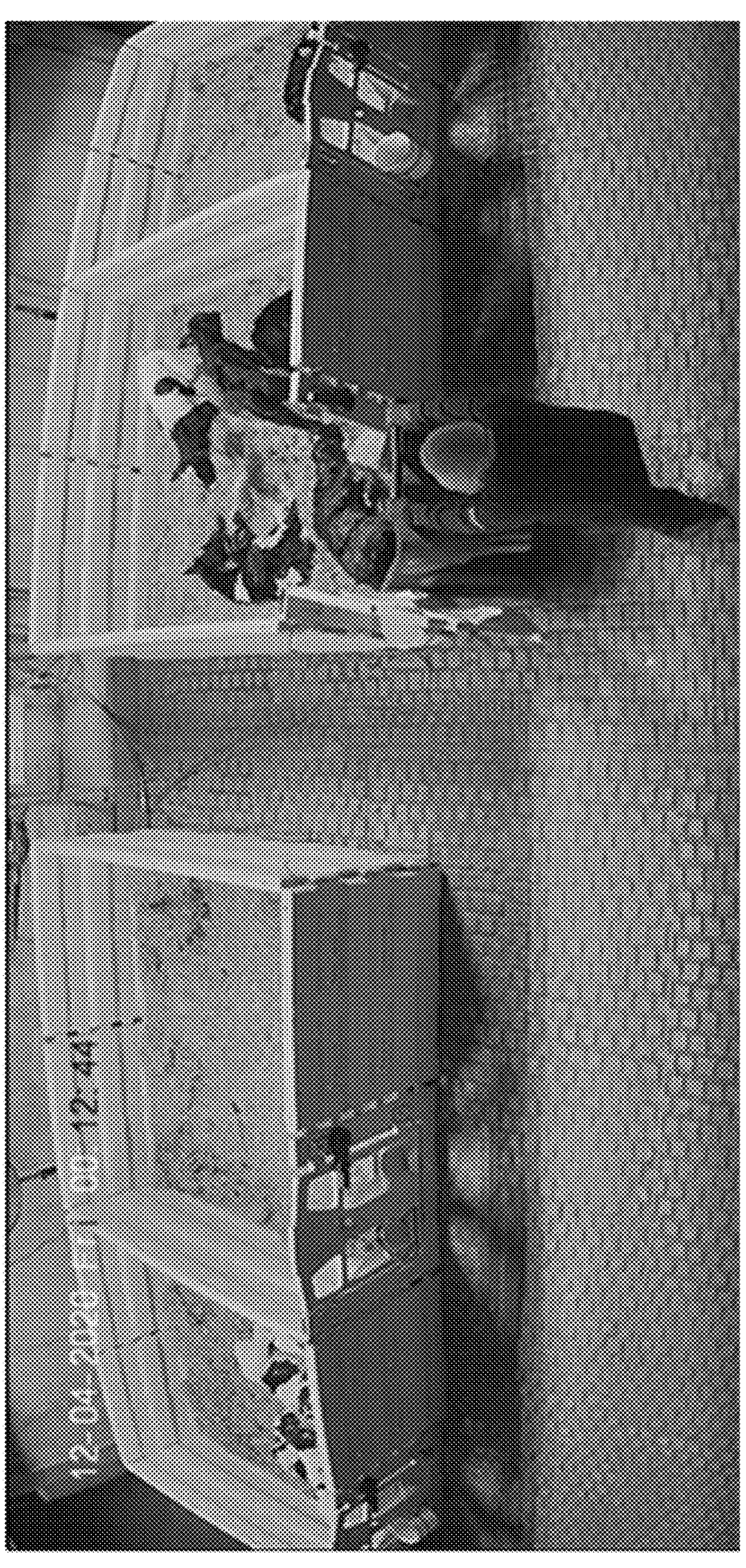
FIG. 17 shows an example of an employee violating a calf uploading protocol.

FIG. 17 shows an example of an employee violating a calf uploading protocol. Here, instead of helping the calf out of wheelbarrow, the employee kicked on the wheelbarrow and dumped the calf out using unnecessary force. This detection would result in an increased probability score.

Figure 18:
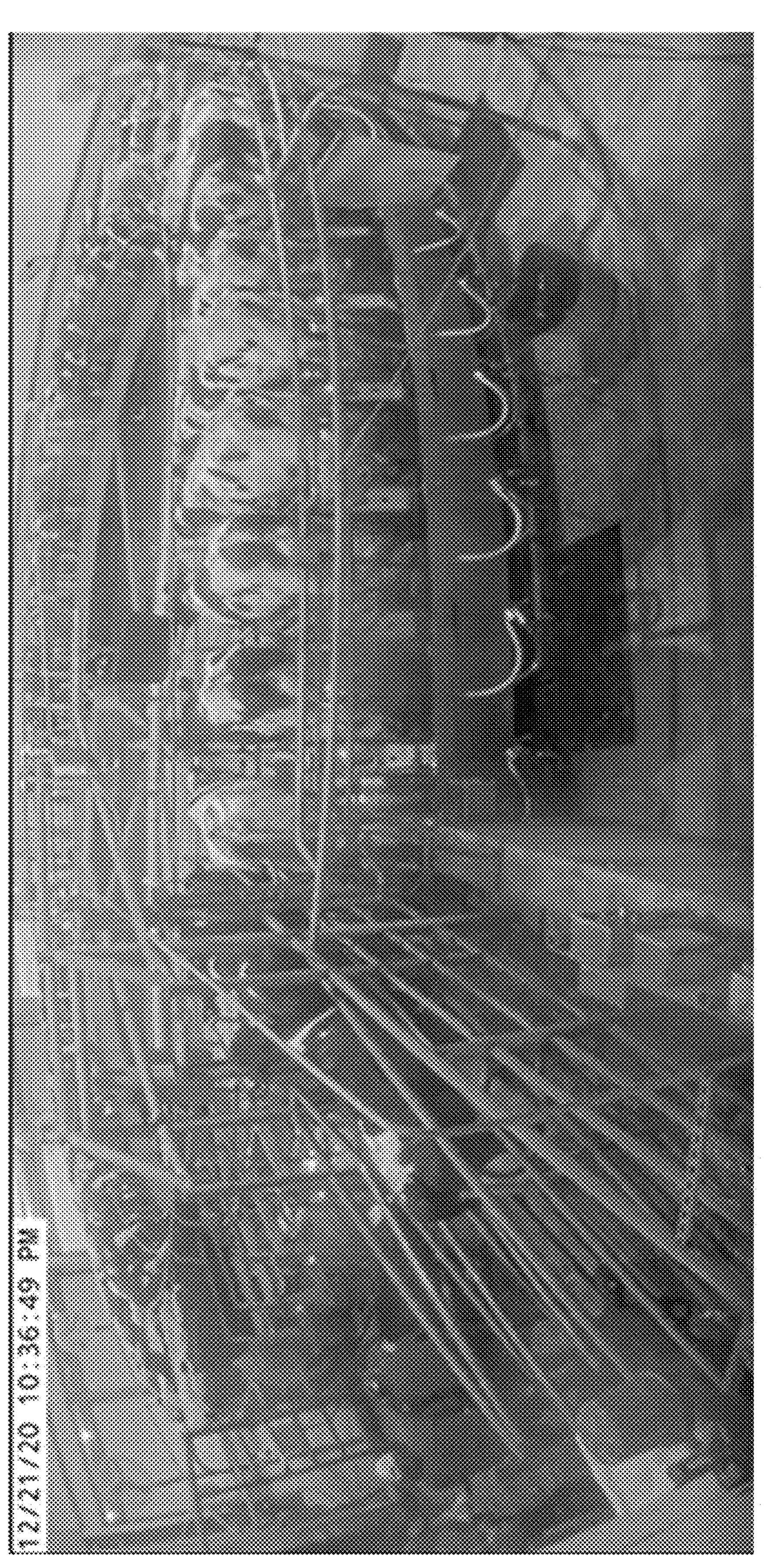
FIG. 18 shows an example in which a cow is down and workers are pulling the cow away from the milk parlor.

FIG. 18 shows an example in which a cow is down and workers are pulling the cow away from the milk parlor. Though this is not considered abuse, farm managers want to closely monitor these types of behaviors to make sure workers follow the cow removing protocol, as improper handling a down cow may cause the injury of the cow.

Figure 19:
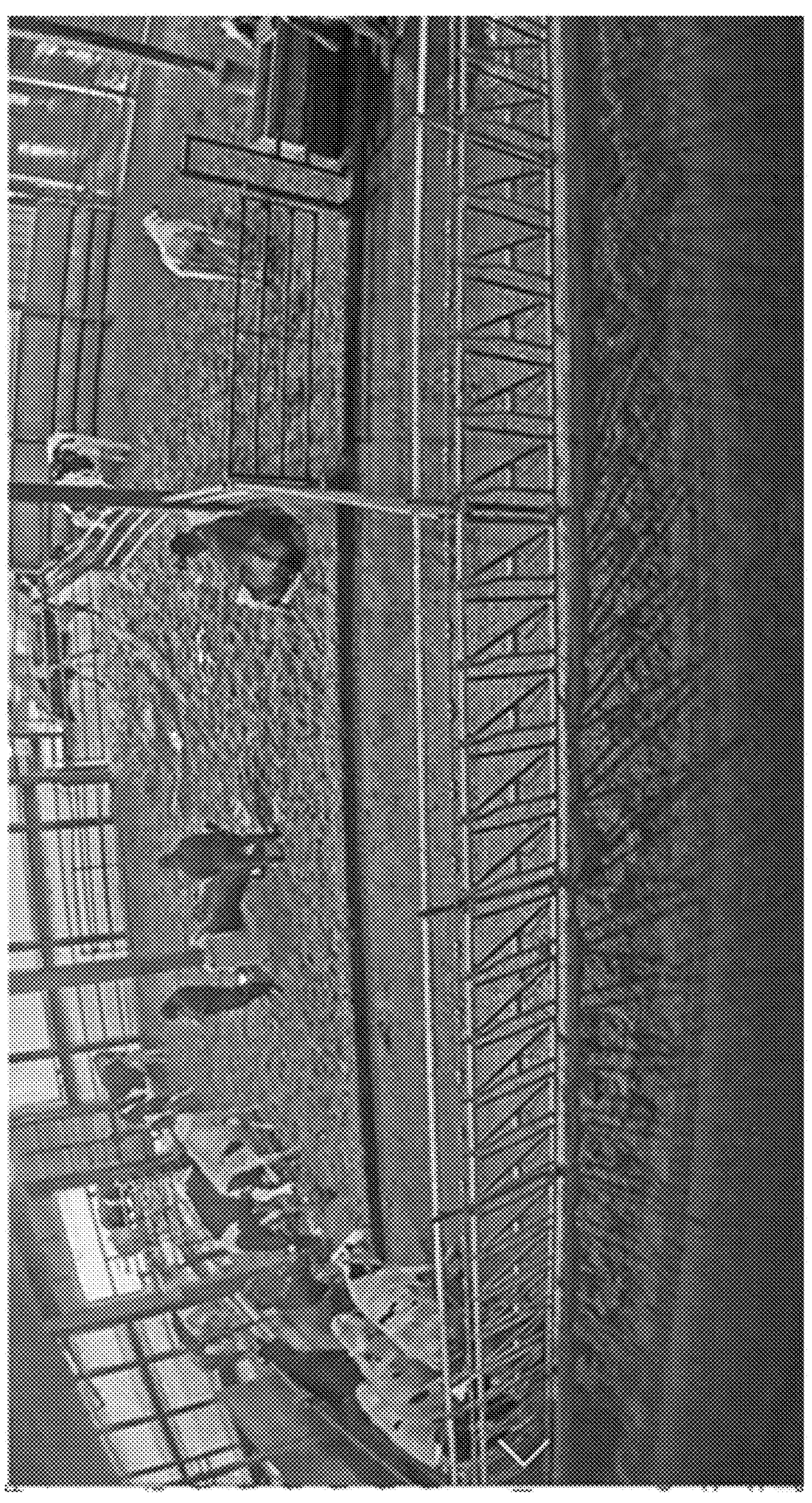
FIG. 19 shows an example of euthanasia.

FIG. 19 shows an example of euthanasia. Here, the employee will use rifle to execute a sick cow. Although this is not considered abuse, the farm managers want to closely monitor euthanasia procedures to ensure that the person follows the protocol so the sick cow is not abused.

Figure 20:
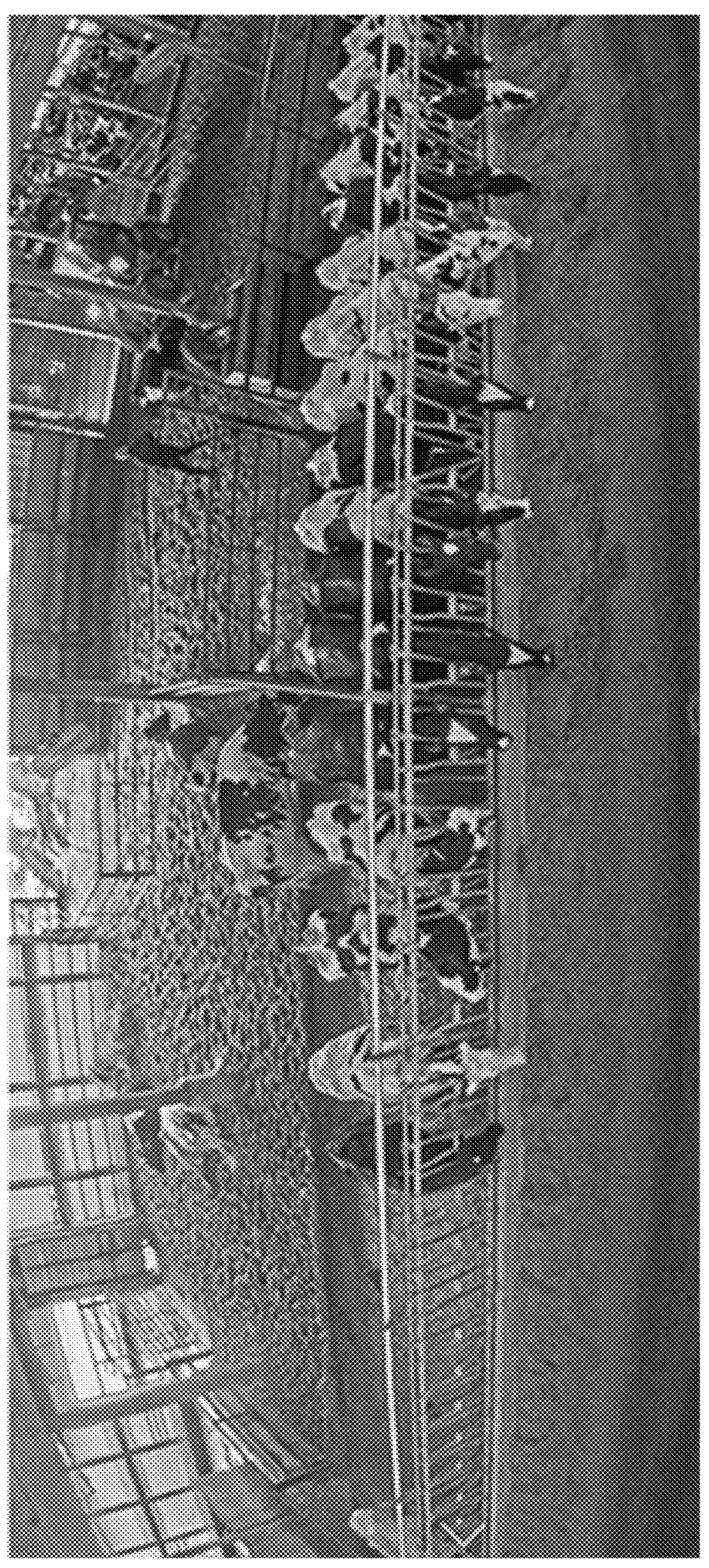
FIG. 20 shows an example of carcass removal.

FIG. 20 shows an example of carcass removal. In this case, a tractor is often used to remove the corpse of a dead cow or calf. The farm manager wants to closely monitor the removal procedure to ensure that the dead cow receives necessary respect.

Set Area of Interest (AOI) for Event Detection

Human/animal interaction is very common. Sometimes users are only interested in certain specific areas for event detection. Certain exemplary embodiments allow the user to set the Area of Interest (AOI) for specific cameras.

Figure 21:
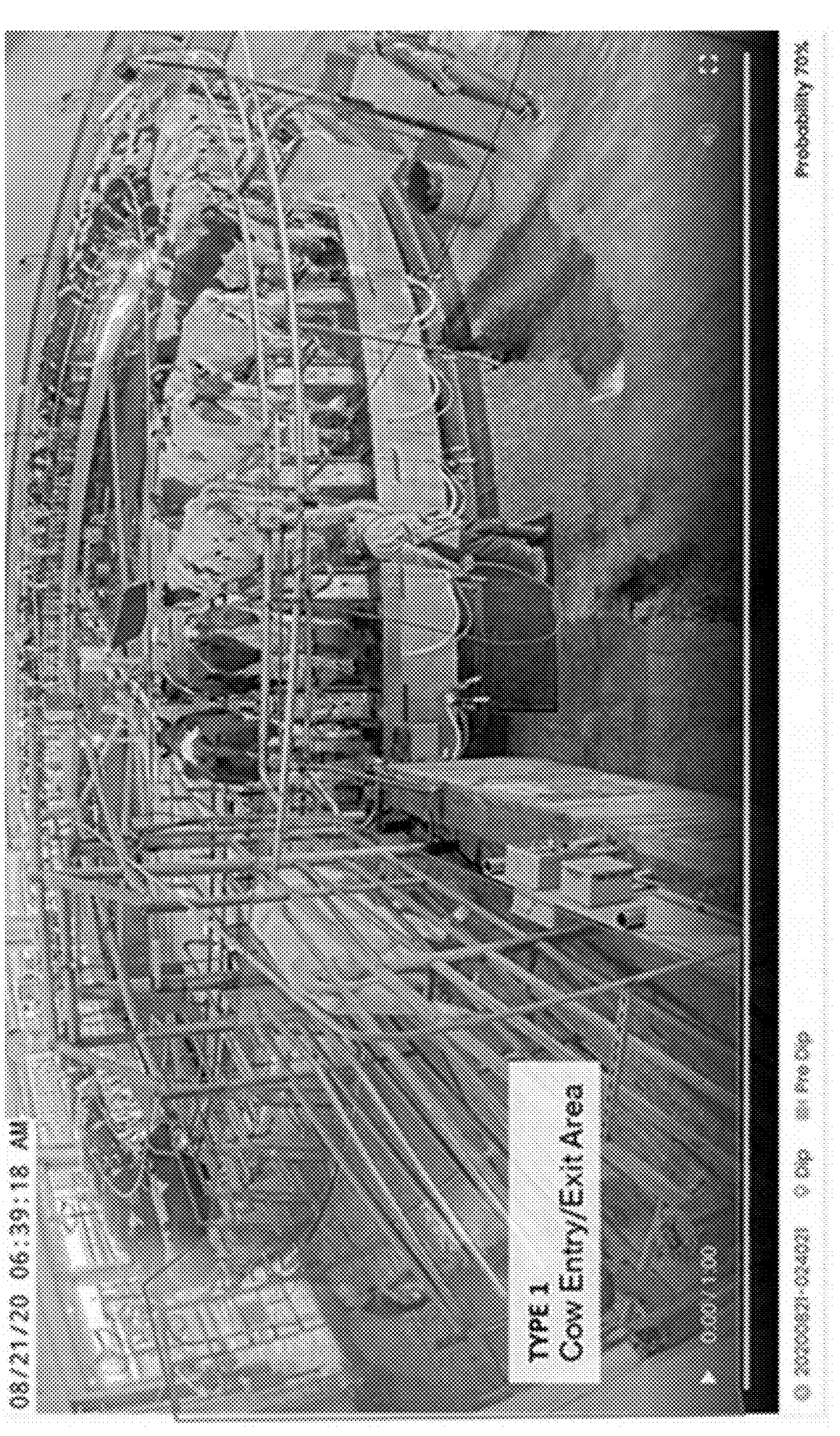
FIG. 21 shows one example of a marked area of interest.

For example, FIG. 21 shows, in this camera, the user has marked an area (specifically the cow entry/exit area to the milking parlor, which is generally where most of accidents occur, while the rest of the area is unimportant). Therefore, certain exemplary embodiments will focus on monitoring the marked areas.

For another example, FIG. 22 shows the maternity area where the mother cow and baby calf will exist. The human/animal interaction in this are needs to be closely monitored and therefore can be selected as an AOI for monitoring.

CONCLUSION

It should be noted that headings are used above for convenience and are not to be construed as limiting the present invention in any way.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the video analytics system) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or"

as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, potential subject matter that may be claimed (prefaced with the letter "P" so as to avoid confusion with the actual claims presented below) includes:

P1. A video analytics system for detecting animal abuse, the system configured to process successive video frames to identify objects of interest including at least humans, create mathematical models of such objects, analyze movements of such objects, determine mathematically and objectively whether or not the analyzed movements meet predetermined criteria for possible abuse, and, when an instance of possible animal abuse is detected, output information identifying the instance of possible animal abuse via a user interface.

P2. A system according to claim P1, wherein artificial intelligence and machine learning techniques are used in the analysis process.

P3. A system according to any one of the preceding claims, wherein video analytics are performed substantially in real-time on each of a number of video streams or clips.

P4. A system according to any one of the preceding claims, wherein the video analytics system identifies and models objects in the video via temporal and spatial modeling based on raw pixels.

P5. A system according to any one of the preceding claims, wherein the video analytics system identifies boundaries in an image from the raw pixels and identifies features of objects based on the boundaries.

P6. A system according to claim P5, wherein the video analytics system tracks the features across multiple images to analyze movements of such objects and determines mathematically and objectively whether or not the analyzed movements meet predetermined criteria for possible abuse.

P7. A system according to any one of the preceding claims, wherein the objects included humans, animals, and possible tools and weapons.

P8. A system according to any one of the preceding claims, wherein the mathematical models include stick-figure models.

P9. A system according to claim P8, wherein the system analyzes movements of such objects by analyzing movements of the stick-figure models.

P10. A system according to any one of the preceding claims, wherein the predetermined criteria are mathematical models defining ethical and unethical movements.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A video analytics system for detecting animal abuse, the system comprising:

a controller coupled to receive video data from at least one camera, the controller comprising at least one hardware processor coupled to at least one tangible, non-transitory computer readable medium containing instructions executable by the at least one processor to cause the controller to process successive video frames using artificial intelligence or machine learning temporal and spatial modeling to identify object boundaries in each of the successive video frames from raw video frame pixels, identify object features including at least human body parts in the video frames based on the object boundaries including at least one of an arm, a leg, a torso, or a head, create mathematical models of such object features, use the mathematical models to analyze movements of such objects by tracking the object features across the plurality of successive video frames to determine at least one of speed or directional motion of the body parts, determine mathematically and objectively whether or not the speed and/or directional motion of the body parts meet predetermined criteria for possible abuse of an animal including determining a probability score based on the speed and/or directional motion and at least one accident type and determining if the probability score meets a predetermined numerical threshold, and, when an instance of possible animal abuse is detected, output information identifying the instance of possible animal abuse via a user interface.

2. A system according to claim 1, wherein the controller uses artificial intelligence or machine learning techniques in the analysis process, optionally wherein the controller receives feedback from a human regarding the identified instance of possible animal abuse and uses the feedback to enhance the artificial intelligence or machine learning techniques for future analysis.

3. A system according to claim 1, wherein the controller performs the video analytics substantially in real-time on each of a number of video streams or clips.

4. A system according to claim 1, wherein the temporal and spatial modeling uses a deep neural network trained to predict object features.

5. A system according to claim 4, wherein the object features include object feature points.

6. A system according to claim 5, wherein the probability score is a normalized weighted probability score.

7. A system according to claim 1, wherein the objects further include at least one of an animal, a tool, or a weapon.

8. A system according to claim 1, wherein the mathematical models include stick-figure models including the body parts and wherein the controller analyzes movements of such objects by analyzing movements of the stick-figure models.

9. A system according to claim 1, wherein the predetermined criteria are mathematical models defining ethical and unethical movements.

10. A system according to claim 1, wherein the information identifying the instance of possible animal abuse includes at least one of a video clip showing the instance of possible animal abuse, a link to a portion of a video showing the instance of possible animal abuse, or information including a camera identifier, day, and time.

11. A system according to claim 1, wherein the controller allows the user to view video clips showing instances of possible animal abuse based on the probability scores.

12. A method for detecting animal abuse in a video analytics system comprising a controller coupled to receive video data from at least one camera, the controller comprising at least one hardware processor coupled to at least one tangible, non-transitory computer readable medium containing instructions executable by the at least one processor to cause the controller to perform computer processes comprising:

processing successive video frames using artificial intelligence or machine learning temporal and spatial modeling to identify object boundaries in each of the successive video frames from raw video frame pixels and to identify object features including at least human body parts in the video frames based on the object boundaries including at least one of an arm, a leg, a torso, or a head;

creating mathematical models of such object features;

using the mathematical models to analyze movements of such objects by tracking the object features across the plurality of successive video frames to determine at least one of speed or directional motion of the body parts;

determining mathematically and objectively whether or not the speed and/or directional motion of the body parts meet predetermined criteria for possible abuse of an animal including determining a probability score based on the speed and/or directional motion and at least one accident type and determining if the probability score meets a predetermined numerical threshold; and when an instance of possible animal abuse is detected, outputting information identifying the instance of possible animal abuse via a user interface.

13. A method according to claim 12, wherein the controller uses artificial intelligence or machine learning techniques in the analysis process, optionally wherein the controller receives feedback from a human regarding the identified instance of possible animal abuse and uses the feedback to enhance the artificial intelligence or machine learning techniques for future analysis.

14. A method according to claim 12, wherein the controller performs the video analytics substantially in real-time on each of a number of video streams or clips.

15. A method according to claim 12, wherein the temporal and spatial modeling uses a deep neural network trained to predict object features.

16. A method according to claim 15, wherein the object features include object feature points.

17. A method according to claim 16, wherein the probability score is a normalized weighted probability score.

18. A method according to claim 12, wherein the objects further include at least one of an animal, a tool, or a weapon.

19. A method according to claim 12, wherein the mathematical models include stick-figure models including the body parts and wherein the controller analyzes movements of such objects by analyzing movements of the stick-figure models.

20. A method according to claim 12, wherein the predetermined criteria are mathematical models defining ethical and unethical movements.

21. A method according to claim 12, wherein the information identifying the instance of possible animal abuse includes at least one of a video clip showing the instance of possible animal abuse, a link to a portion of a video showing the instance of possible animal abuse, or information including a camera identifier, day, and time.

22. A method according to claim 12, wherein the controller allows the user to view video clips showing instances of possible animal abuse based on the probability scores.

* * * * *